No. 748,804. PATENTED JAN. 5, 1904.
W. H. SMYTH & A. B. BOWERS.
DREDGING MACHINE.
APPLICATION FILED MAY 9, 1898.
NO MODEL. 5 SHEETS—SHEET 1.

No. 748,804. PATENTED JAN. 5, 1904.
W. H. SMYTH & A. B. BOWERS.
DREDGING MACHINE.
APPLICATION FILED MAY 9, 1898.
NO MODEL. 5 SHEETS—SHEET 3.

Witnesses:
G. W. Ueffinger
J. H. Miller

Inventors.
W. H. Smyth
A. B. Bowers

THE NORRIS PETERS CO., PHOTO-LITHO., WASHINGTON, D. C.

No. 748,804. PATENTED JAN. 5, 1904.
W. H. SMYTH & A. B. BOWERS.
DREDGING MACHINE.
APPLICATION FILED MAY 9, 1898.
NO MODEL. 5 SHEETS—SHEET 5.

Witnesses:
G. W. Ueffinger
J. H. Miller

Inventors.
W. H. Smyth
A. B. Bowers

No. 748,804. Patented January 5, 1904.

UNITED STATES PATENT OFFICE.

WILLIAM H. SMYTH AND ALPHONZO B. BOWERS, OF SAN FRANCISCO, CALIFORNIA.

DREDGING-MACHINE.

SPECIFICATION forming part of Letters Patent No. 748,804, dated January 5, 1904.

Application filed May 9, 1898. Serial No. 680,234. (No model.)

*To all whom it may concern:*

Be it known that we, WILLIAM H. SMYTH, mechanical engineer, and ALPHONZO B. BOWERS, civil engineer, citizens of the United States, residing at San Francisco, in the county of San Francisco and State of California, have invented certain new and useful Improvements in Dredging-Machines, of which the following is a specification.

This invention relates to a machine for dredging.

Heretofore difficulty has been experienced when operating suction-dredgers in material in which large stones, boulders, and other resistant masses are encountered, and an equal difficulty has also been met in the employment of clam-shell, scoop, or other forms of bucket-dredgers in material otherwise adapted to their use, but in which sand, soft, semiliquid, or other finely-divided material forms a portion of the spoil. These two opposite characters of conditions has made necessary the employment of the distinct types of dredgers mentioned.

The object of the present invention is to provide in one machine an effective device to operate under either or both of the stated conditions.

More particularly stated, the object of the invention is to provide a simple and effective dredging-machine to operate under conditions either of suction or bucket dredging singly or in combination and which shall be capable of separating coarse gravel or boulders from sand or other finely-divided material and transporting each separately to a desired place of deposit, and to accomplish these objects in such form that the suction-pipe, inlet, mouth, or nozzle may, when desired, be in close proximity to the point of excavation, also that the inflowing current may be maintained at maximum speed in the suction-pipe, and, further, to provide for continuous working uninterrupted by removable obstructions, and means for removing obstructions from the mouth of the suction-pipe.

Some of the preferable forms in which this invention may be embodied by which these objects are accomplished are shown in the devices illustrated in the accompanying drawings, in which—

Figures 1, 2, 3:
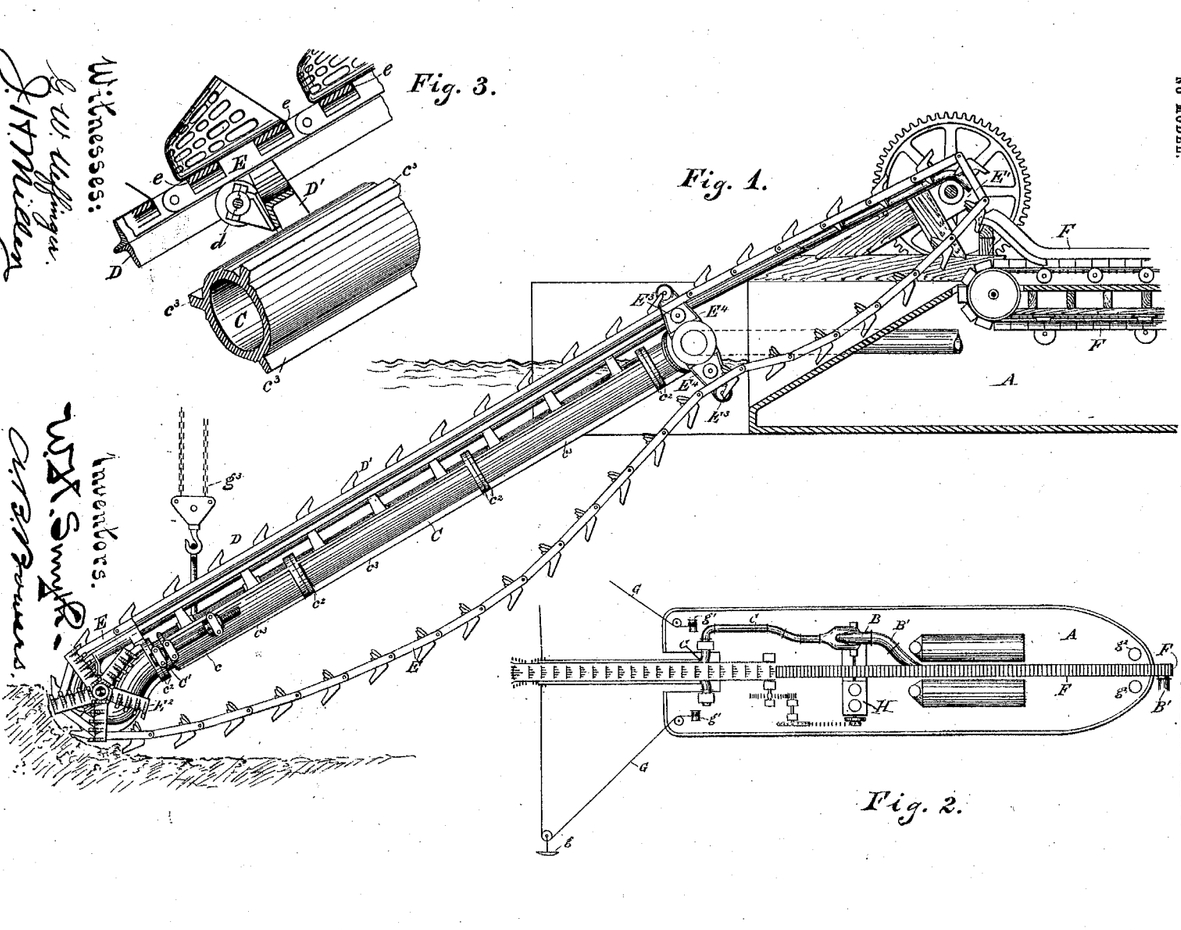
Figure 1 is a longitudinal view of a portion of the invention mounted upon a floating vessel.
Fig. 2 is a plan showing an arrangement of some of the parts upon the floating vessel.
Fig. 3 is a detail of a portion of the chain with elevator-baskets or skeleton buckets attached supported upon carrying-rollers. The view is partly in section to more clearly illustrate it.

Referring to the accompanying drawings, A, Figs. 1 and 2, is a floating vessel upon which the devices herein described are usually mounted, though they may be placed upon skids, tracks, or any other foundation suitable to the location, material, or conditions of operation.

B is an exhausting apparatus, shown in the drawing Fig. 2 as a centrifugal pump through the agency of which the atmosphere forces the spoils into the suction-pipe, and this pump forces them through the discharge-pipe to a place of deposit.

B' is a device through which spoils are discharged. It may be of any suitable character, consisting in the present instance, Fig. 2, of a pipe.

Figure 12:
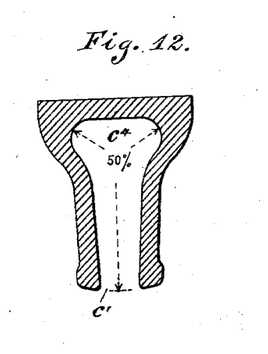
Fig. 12 is a section through X X of Fig. 9.
Figure 13:
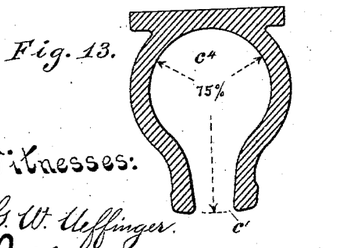
Fig. 13 is a section through Y Y of Fig. 9.
Figure 14:
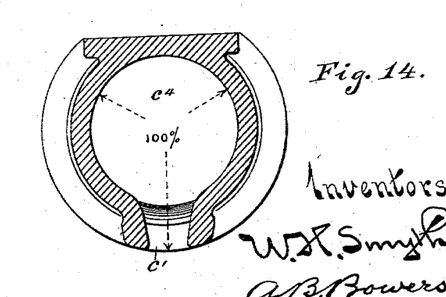
Fig. 14 is a section through Z Z of Fig. 9.
Figure 15:
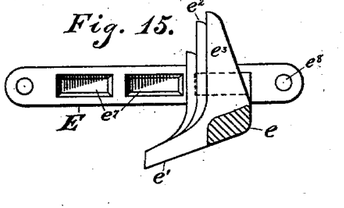
Fig. 15 is an inside view of chain-link, showing digging and elevating devices of one form socketed therein.
Figure 16:
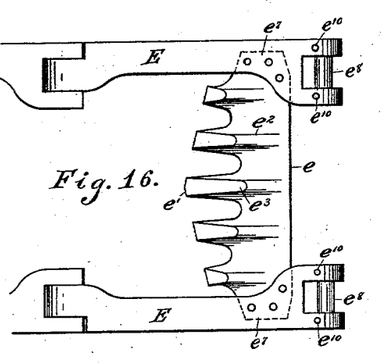
Fig. 16 is a plan of both side links and the attached devices, showing also the pins for holding the link hinge-pin in position.
Figure 17:
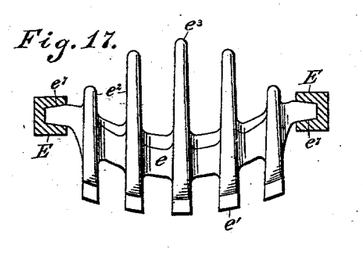
Fig. 17 is an end view of the attached devices and cross-section of links.
Figure 18:
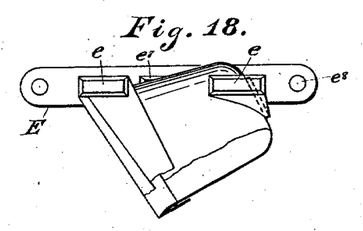
Fig. 18 is a view of the same link as is shown in Fig. 15 with another form of digging and elevating device socketed therein.
Figure 19:
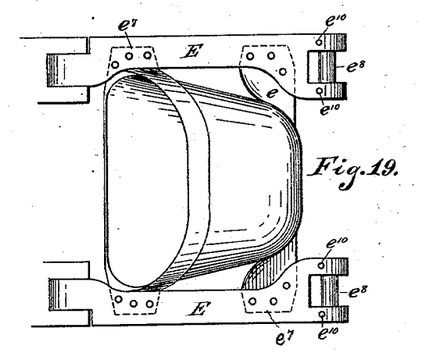
Fig. 19 is a plan view of Fig. 18.
Figure 20:
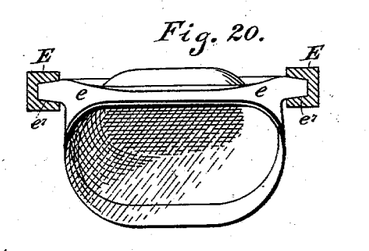
Fig. 20 is an end view of Fig. 18, links in section.

C, Figs. 1, 2, 3, 4, 5, 6, is a suction-pipe of the exhausting apparatus extending toor near the point of excavation. The outer portion of this pipe may be connected to the inner part by a hinge-joint or any other suitable form of flexible connection to admit of its being moved in various directions about said joint. In the present form the joint is shown, Figs. 1 and 2, as strong hollow trunnions, one of which is formed of the suction-pipe turned at right angles with an easy curve. At its lower end it is preferably made of telescopic form C', Fig. 4, whereby it is extensible longitudinally, and adjusting-screws $c$ $c$ provided, Figs. 1, 4, and 5, to effect this longitudinal adjustment. The suction-pipe is preferably made in sections joined by flanges $c^2$, Figs. 1 and 4. Between the flanges running longitudinally of the pipe are radial ribs $c^3$, which stiffen the pipe and serve as attaching-pieces for other portions of the construction, Figs. 1, 3, 4, 5, and 6. The inlet-mouth $c'$ of the suction-pipe C is a long narrow opening approximating in area the cross-sectional area of the suction-pipe, Figs. 4, 9, 10, and 11. Between this inlet $c'$ and the suction-pipe proper is a throat $c^4$, Figs. 4, 11, 12, 13, and 14, of varying cross-sectional shape, merging gradually the long narrow form of the inlet $c'$ into the form of the normal cross-section of the suction-pipe. It is also preferably of such form that its area at every point is substantially proportioned to the area of the proportion of the inlet for which it acts as conduit. This is shown in Figs. 12, 13, and 14, which are cross-sections, respectively, of X X, Y Y, Z Z of Fig. 9. Thus the section X X, Figs. 9 and 12, acts as conduit for one-half of the inlet, and is consequently substantially one-half of the area of the suction-pipe. The section Y Y, Figs. 9 and 13, acts as conduit for three-fourths of the inlet, and is thus substantially three-fourths of the area of the suction-pipe. Z Z, Figs. 9 and 14, conducts from the whole of the inlet, and is therefore substantially the same area as the suction-pipe. So with the intermediate sections each has a capacity substantially equal to the proportion of the inlet for which it serves as conduit, at the same time merging the adjacent sections with easy curves, as shown in Figs. 9, 10, 11, 12, 13, and 14. This device $C^2$ thus forms a sort of nozzle or mouthpiece and may for convenience be made detachable from the suction-pipe proper, Figs. 4, 9, 10.

Figures 21, 22:
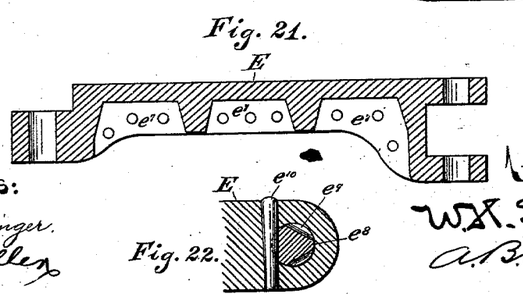
Fig. 21 is a longitudinal section of one of the side links of the chain, showing the sockets into which the digging and elevating devices are secured.
Fig. 22 is a section of a portion of one of the links, showing the method of securing the hinge-pins.

E represents an endless traveling elevator of any suitable form, preferably, though not necessarily, constructed to serve as an excavator. It may be formed of connected links and provided with cutting-teeth, blades, diggers, rakes, buckets, or any other suitable form of excavating or conveying devices, one of which is shown in Figs. 1, 4, 5, and 8 and others in Figs. 3 and 6, these latter being forms of baskets or of buckets. The baskets or skeleton buckets, Fig. 3, are of open-work or mesh of sufficient size to permit sand or other fine material to be withdrawn from the basket through these perforations by the inrushing current of the suction-pipe. This excavator and carrier may be formed of one or more chains or other suitable devices. It is shown in the drawings, Figs. 4, 5, 8, 15, 16, 17, and 21, as composed of two chains side by side connected in one form by bars or rods $e$, armed with teeth $e'$, in rows crosswise of the chains, to which may be added, if desired, elevator-fingers $e^2$, formed of inward extensions of the teeth $e'$ or projections beyond the normal inner surface of the chain. One of the fingers or projections $e^3$ may be suitably placed and arranged to enter and travel longitudinally in the narrow suction-inlet $c'$, Figs. 4 and 8, thus forming a device traveling across the inlet of the suction-pipe, having projections extending beyond the normal surface of the device and across the plane of the opening of the suction-pipe, so as to enter thereinto. The links of the chain are preferably made with a number of sockets $e^7$ $e^7$, Figs. 5, 6, 8, 15, 16, 17, 18, 19, 20, and 21, in the inner side for the reception of lugs or projecting ends of bars $e$ $e$, by which the excavator and elevator devices are attached thereto. These sockets may be of any suitable size and number. In the drawings they are shown as longitudinal elongated depressions in the side of the link. In Figs. 1, 4, 5, 8, 15, 16, and 17 digging and excavating fingers are shown on the bars $e$ $e$ in one of the end sockets of each link, Figs. 15, 16, and 17, though they may be, if deemed advisable, placed in any of the sockets, or each socket may be provided with operating devices of like or dissimilar character. In Figs. 3, 6, 18, 19, and 20 the digging and elevating devices are shown as either baskets or buckets, and two or more attaching-bars $e$ $e$ are employed occupying two or more of the sockets in each link. The attaching lugs or projections may of course, in the case of cast devices, either buckets or digging-fingers, as shown in Figs. 1, 4, 5, 8, 15, 16, 17, be cast with and on such buckets or other device, and thus take the place of the bars $e$ $e$. The preferable construction of one side member of the compound chain is shown clearly in the sectional view Fig. 21. The hinge pivot or pin $e^8$, Fig. 22, is provided with a number of facets, grooves, or depressions around the circumference, shown as grooves $e^9$, Fig. 22, preferably one hundred and twenty degrees apart into one of which a pin $e^{10}$ is inserted. This arrangement permits the pin $e^8$ to be turned after being in use some time, thus bringing the wear upon a new unworn surface and securing the full benefit of the whole wearing-surface of the pin.

E', Fig. 1, is a chain-tumbler of ordinary form preferably mounted upon the floating vessel. The tumber E' engages with the upper bight or turn of chain E and transmits power and traveling motion thereto. $E^2$ is another tumbler of somewhat peculiar form, Figs. 1, 7, and 8. It is preferably journaled on the mouthpiece or nozzle $C^2$ at or near the center of curvature, Figs. 1, 4, 7, and 8. This tumbler is made with free-ended radiating arms $E^3$, forming a spider preferably having no circumscribing band or ring. Each arm terminates in a tooth cutter or blade $e^4$ of any suitable form and is provided with side teeth-cutters or blades of any suitable form projecting outwardly from the face of the arm $E^3$, Figs. 1, 4, 7, and 8. The arms themselves are sharp-edged and have a cutting lead. The inner side of each arm is provided with a seat $e^6$ for the chain, Figs. 7, 8. The tumbler-cutter is suitably journaled on the mouthpiece or nozzle $C^2$ substantially concentric with the periphery, as shown in Figs. 1, 4, 7, 8. In the form shown in the drawings it is deemed advisable to place the power-tumbler E' upon the floating vessel beyond the flexible joint of the suction-pipe. Provision is therefore made for guiding the upper and lower fold of the chain as the suction-pipe changes its angle with the vertical movement while in operation. This consists of the guide-rollers $E^3$ upon the brackets $E^4$, Fig. 1, also the parallelism of the upper and lower sides of the chain-links.

Figures 4, 5, 6:
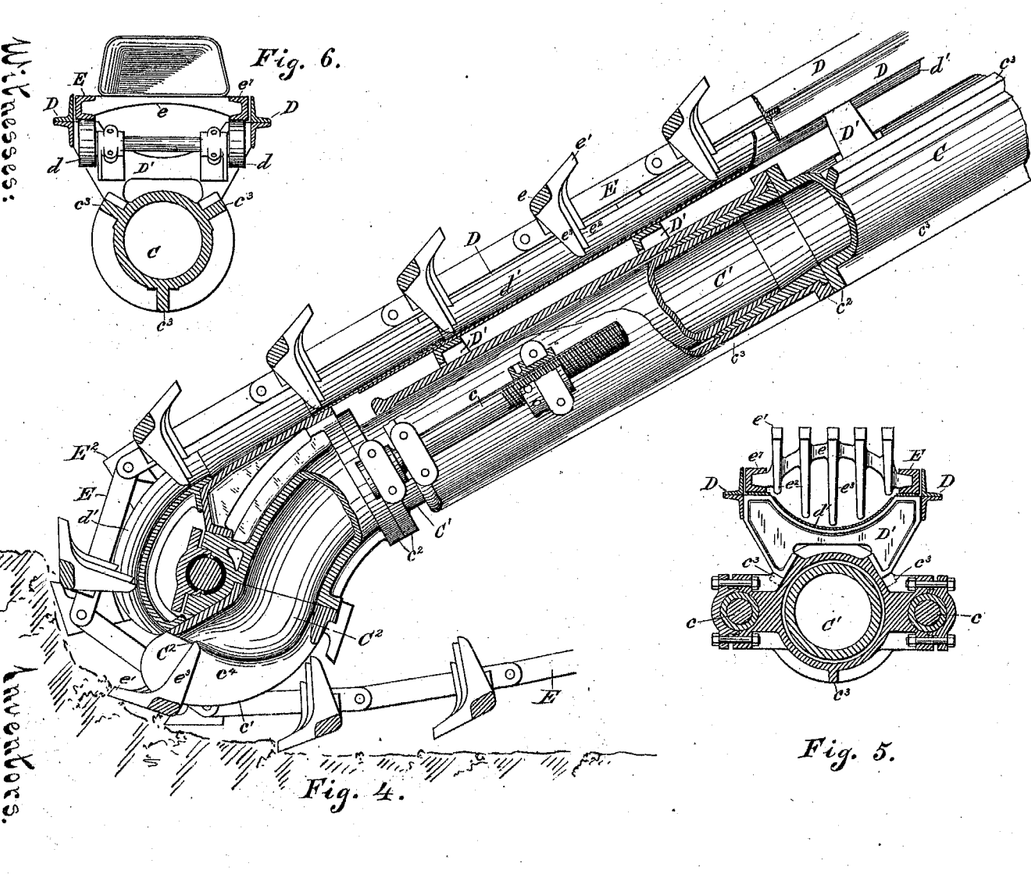
Fig. 4 is a longitudinal view of the lower portion of the suction-pipe and nozzle, showing one form of the digging and elevating devices, also one of the adjusting-screws.
Fig. 5 is a cross-section through the telescopic portion of the suction-pipe and adjusting screws and nuts.
Fig. 6 is a cross-section of the suction-pipe, showing the chain-supporting wheels or rollers and chain with another form of excavating and elevating attachment.
Figure 7:
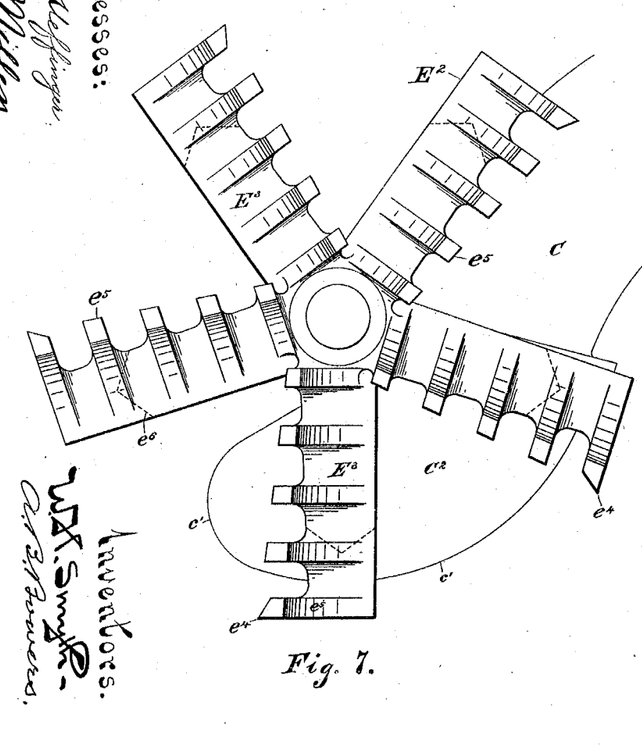
Fig. 7 is a side elevation of the rotary side-cutting excavator tumbler in position.
Figure 8:
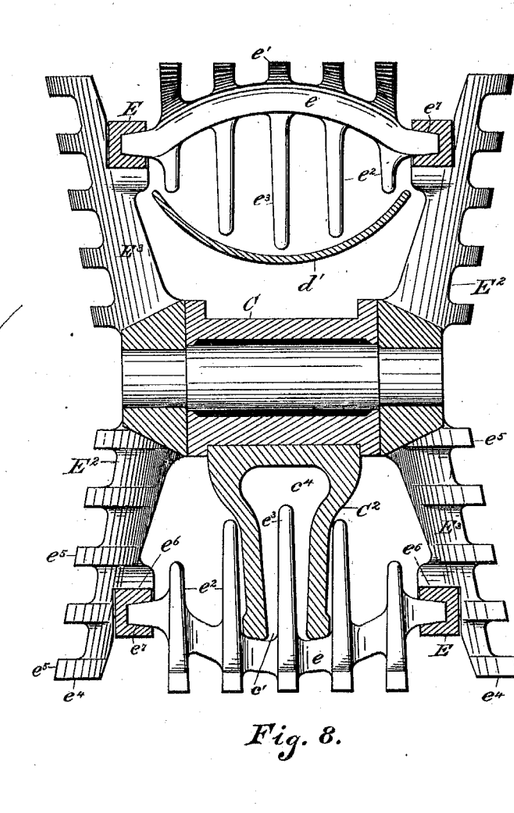
Fig. 8 is a diagrammatic cross-section of the rotary side-cutting excavator-tumbler with digging and elevating chain in position, also suction-pipe, with obstruction-removing finger passing through its mouth or inlet, and an elevator-trough, sometimes used, the elevator-fingers showing therein.
Figure 9:
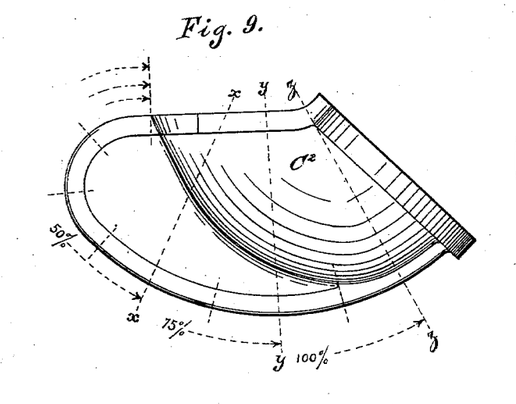
Fig. 9 is a side view of nozzle.
Figure 10:
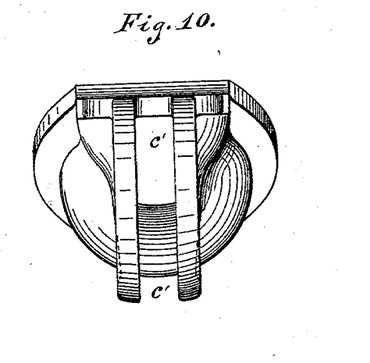
Fig. 10 is an outer end view of nozzle.
Figure 11:
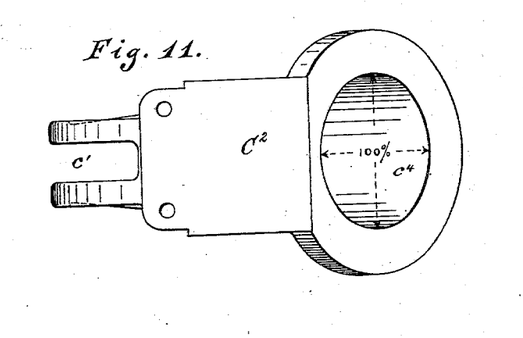
Fig. 11 is a plan view of nozzle.

Adjacent and preferably connected to the suction-pipe may be provided longitudinal tracks, ways, or guides D, with or without supporting-rollers $d$, Figs. 3 and 6, to guide and support the chain excavator or elevator. These guides being suitably placed assist in stiffening and supporting the suction-pipe against vertical and lateral distortion, Figs. 1, 3, 4, 5, and 6. A carrier-trough spout or chute $d'$, secured to the suction-pipe by brackets D', preferably attached to ribs $c^3$, may also be provided, in which the elevator rake-fingers travel, Figs. 1, 4, 5, and 8, though this may be dispensed with if carrying baskets or scoops, such as are shown in Figs. 3 and 6, are employed. In the latter case the bearing-rollers $d$, Figs. 3 and 6, are preferable to the flat tracks for supporting the chains, and they may be used in either case.

A suitable chute or conveyer F, Fig. 1, may be located upon the boat at the inner end of the elevating device. In the present instance I have shown in Figs. 1 and 2 a traveling belt conveyer extending rearward of the dredge-boat. If it is desired to discharge sidewise into a scow or otherwise, this conveyer may be placed at right angles and discharge outboard, or it may be replaced by a simple chute or spout.

Suitable warping and operating lines G, spuds $g^2$, devices $g$ $g'$ $g^3$, and means for actuating them are provided, whereby the suction-pipe and dredge-boat are moved in the performance of their functions. Engines H or other suitable power connections are also provided for operating the excavators, elevators, conveyers, pumps, and other moving or operating devices necessary or desirable for the efficient operation of the invention; but these being within the knowledge of ordinary mechanics skilled in the arts involved need not here be more particularly described and are sufficiently shown for the purposes of the present disclosure in Fig. 2 of the drawings.

It is desirable in some instances, as in gold-mining in river-beds, to carry the suction-pipe inlet very close to the point of excavation and also to maintain the full speed of the inflowing current without diminution of intensity at any point in the outboard portion of the suction-pipe. The construction herein disclosed and described, it will be seen, secures these desirable conditions. The shape of the suction-pipe inlet conforming as it does to the path of the cutting implements conforms also to the shape of the bank, which it partly parallels at but a few inches distance just enough to permit of the free entrance of the excavated material. The inlet of the suction-pipe being of substantially the same area as that of the cross-section of the suction-pipe, the speed or intensity of the inrushing current is substantially the same as that of the maximum speed maintained in the pipe, and consequently is of maximum efficiency. The shape of the nozzle being at all points in its sectional area substantially proportioned to the inlet area for which it serves as conduit, the speed of the current passing through suffers no material diminution therein.

It is a common occurrence in suction-dredging that the stream induced by atmospheric pressure packs and holds sticks, stones, and other obstructions against the inlet of the suction-pipe, necessitating the stoppage of this stream to permit of the obstructions dropping by gravity or their removal by other means. This difficulty is entirely avoided and overcome by the passage of the traveling fingers on the chain through the inlet, as disclosed herein.

Heretofore the field of operation of suction-dredgers, as hereinbefore stated, has been practically limited to moderately soft material or such material as could readily be cut and divided by knives and other cutting implements. The presence of rocks, stones, and other large and resistant masses constituted an almost insuperable barrier to the use of this form of dredger in such material. The present arrangement, combining, as it does, the advantages of the bucket-dredge and the suction-dredge, may be efficiently employed in all characters of work which had heretofore necessitated both forms of dredgers. The present form also eliminates the rapid wear and breakage due to the occasional entrance of large stones into the pipes and pumps.

Having now described this invention, what is claimed as new, and desired to be secured by Letters Patent, is—

1. A suction-pipe provided with a device having projections extending beyond its normal surface adapted to engage with and remove obstructions from the mouth of said pipe and mechanism to actuate said device independent of the water-flow.

2. A suction-pipe and a device attached thereto adapted to enter the mouth thereof and dislodge an obstruction therefrom.

3. A suction-pipe having an undivided inlet and an automatic device adapted to dislodge an obstruction therefrom.

4. A suction-pipe and a traveling chain adapted to dislodge obstructions therefrom.

5. A suction-pipe having a longitudinally-curved inlet and a device having projections extending beyond its normal surface adapted to engage with and remove an obstruction therefrom.

6. A suction-pipe having a narrow inlet or mouth and a throat of cross-sections varying proportionally with the proportion of the inlet to which it acts as conduit.

7. A suction-pipe having its mouth and throat of different form, said throat consisting of a succession of merging cross-sections, each being proportioned to the amount of mouth area to which it serves as conduit.

8. A suction-pipe nozzle or mouthpiece having a longitudinal inlet of greater length than width, and a discharge-outlet in which these dimensions are more nearly uniform, but of substantially like area to that of the inlet and a connecting-throat merging the two forms gradually into each other.

9. A nozzle or mouthpiece having a narrow longitudinal mouth or inlet and an outlet of substantially circular form and like area, and an intermediate throat merging gradually the two forms into each other.

10. A nozzle or mouthpiece having a narrow longitudinal mouth or inlet in its end, a substantially circular outlet of like area, and an intermediate throat of varying cross-sections merging the form of the inlet gradually into that of the outlet.

11. A suction-pipe having a narrow longitudinally-curved mouth or inlet, of substantially its own full-flowing capacity and a throat of varying cross-sections merging gradually the inlet form into that of the normal cross-section of the suction-pipe.

12. A suction-pipe of substantially circular cross-section, having a narrow inlet or mouth of like area to the cross-section of the pipe-inlet and pipe being joined by a throat of cross-sectional areas varying in proportion to the proportion of inlet area to which each cross-section serves as conduit.

13. A suction-pipe having a laterally-flattened substantially arc-shaped end provided with a peripheral inlet and a cutter adjacent thereto.

14. A suction-pipe having a downwardly-curved end, a peripheral inlet therein, and a rotary cutter adjacent thereto.

15. A suction-pipe having a substantially arc-shaped downward extension provided with a peripheral inlet and a rotary disintegrating device journaled substantially concentric therewith.

16. A suction-pipe having a substantially arc-shaped end with a longitudinal peripheral inlet and a two-part rotary excavator between the two parts of which the inlet is located.

17. A suction-pipe provided with longitudinal radial stiffening-ribs and a runway secured to said ribs.

18. An unduplicated suction-pipe made in sections, provided with end flanges and intermediate stiffening-ribs, and longitudinal angle-iron or other ties or braces attached thereto by brackets or other suitable devices.

19. A suction-pipe provided with exterior longitudinal tracks or courses for guiding the movement of a traveling device.

20. A suction-pipe and an exterior longitudinal trough or conduit attached thereon, having tracks or courses to guide a traveling device.

21. A suction-pipe and an exterior longitudinal trough or conduit attached thereon having a longitudinal traveling elevator.

22. A suction-pipe and an exterior longitudinal trough or conduit attached thereon having a longitudinal traveling-chain elevator thereon.

23. A suction-pipe provided with an exterior track or way adapted to brace said pipe and a traveling belt or chain provided with elevating or carrying devices.

24. A suction-pipe and a chain having devices adapted to enter the mouth thereof, whereby obstructions are dislodged.

25. A suction-pipe and an endless-chain elevator thereon.

26. A suction-pipe and an elevator thereon consisting of a multiplicity of hinged sections.

27. A suction-pipe and an excavator thereon consisting of a multiplicity of jointed sections adapted to travel across the inlet of said pipe.

28. A suction-pipe and an excavator thereon consisting of a number of loosely-connected links provided with digging blades or teeth.

29. A suction-pipe and a traveling chain thereon provided with digging blades or teeth.

30. A suction-pipe and a traveling chain thereon provided with digging blades or teeth and elevating devices.

31. A suction-pipe and a digging and elevating chain thereon.

32. An excavator comprising a suction-pipe and a traveling chain thereon, provided with rake-teeth.

33. A suction-pipe having a tumbler located thereon near its outer end upon which is mounted a digging-chain.

34. A suction-pipe having a tumbler located on and adjacent to its outer end upon which is mounted a chain armed with digging implements and supplied with elevating devices.

35. A dredger comprising a suction-pipe having a flexibly-jointed outer portion and a traveling chain supported thereby, provided with digging blades or teeth.

36. A dredger comprising a flexibly-jointed suction-pipe and a chain-excavator thereon.

37. In a dredger for simultaneously removing intermixed coarse and finely-divided material, a flexibly-jointed suction-pipe and a spoil-conveying device thereon.

38. In a dredger for simultaneously removing intermixed coarse and finely-divided material, a flexibly-jointed suction-pipe and a chain spoil-conveying device thereon.

39. An excavating device consisting of two traveling chains armed with digging implements and a suction-pipe the inlet of which is intermediate of the chains.

40. An excavating device consisting of two endless traveling chains jointed by plates or bars armed with digging implements or teeth mounted on a flexibly-jointed suction-pipe whereby the excavated material is removed.

41. In a dredger for simultaneously removing intermixed coarse and finely-divided material, a traveling excavator-chain supplied with implements whereby a portion of the material is removed, mounted on a suction-pipe whereby the remainder of the excavated material is removed.

42. In a dredger for simultaneously removing intermixed coarse and finely-divided material, two traveling chains provided with implements secured thereto and intermediate thereof whereby a portion of the material is removed, mounted on a suction-pipe, whereby the remainder of the excavated material is removed.

43. A traveling endless chain provided with spoil-moving devices and a suction-pipe, the inlet of which is located intermediate of the folds of the traveling chain.

44. A traveling endless chain provided with digging attachments and a suction-pipe flexibly jointed to an exhausting apparatus the inlet of said pipe being located intermediate of the folds of the chain.

45. In a dredge for simultaneously removing intermixed coarse and finely-divided material having a flexibly-jointed suction-pipe adapted to remove the finely-divided material, the combination therewith of traveling chains provided with spoil-moving devices, said chains connected together to travel in unison.

46. A traveling endless chain provided with spoil-moving devices and a suction-pipe around the inlet of which said chains travel.

47. A dredger for simultaneously removing intermixed coarse and finely-divided material, provided with a suction-pipe adapted to remove the finely-divided material, with an endless traveling elevator thereon, adapted to remove the coarse material, said suction-pipe flexibly jointed to an exhausting apparatus, said devices coöperating to separate and remove the intermixed material.

48. A suction-pipe with an endless traveling excavator thereon, flexibly jointed to an exhausting apparatus.

49. A dredger for simultaneously removing intermixed coarse and finely-divided material, having a suction-pipe adapted to remove the finely-divided material, with a traveling-chain elevator and excavator thereon, flexibly jointed to an exhausting apparatus located upon a floating vessel and suitable means for discharging the exhausting apparatus and the elevator.

50. A dredger for simultaneously removing intermixed coarse and finely-divided material, having a suction-pipe adapted to remove the finely-divided material, with a chain-tumbler journaled thereon near the inlet of said pipe, a traveling-chain excavator and elevator traveling around said tumbler and a suitable discharging device for said suction-pipe and elevator.

51. A suction-pipe an endless-chain excavator thereon and means for tightening the chain.

52. A telescopic flexibly-jointed suction-pipe and an exterior trough carried thereby.

53. A telescopic flexibly-jointed suction-pipe having an exterior trough and a rotary excavator.

54. A suction-pipe, a transverse rotary excavator thereon and non-resilient means for forcing outward the excavator-carrier.

55. A telescopic suction-pipe and a flexible spoil-moving device thereon.

56. A telescopic suction-pipe and an endless-chain excavator thereon.

57. A telescopic pipe and an endless-chain elevator thereon.

58. A telescopic suction-pipe having a longitudinal track and a traveling spoil-moving device thereon, and means for effecting telescopic adjustment.

59. A telescopic suction-pipe and a screw to effect the telescopic adjustment.

60. A telescopic suction-pipe and a longitudinal screw to effect longitudinal adjustment.

61. A telescopic suction-pipe, an endless-chain excavator and longitudinal screw to effect telescopic adjustment and the tightening of the chain.

62. A detachable suction-pipe nozzle or mouthpiece having a longitudinally-convex curved inlet and a rotary excavator.

63. A detachable suction-pipe nozzle or mouthpiece and an endless traveling excavating device connected therewith.

64. A detachable suction-pipe nozzle or mouthpiece, having a curved slot longitudinal with said pipe and a rotary excavator adapted to work with a side movement of the suction-pipe.

65. A suction-pipe, a traveling chain between the upper and lower fold of which the pipe is located and an excavating device adapted to work with a side feed.

66. A traveling-chain excavator, a rotary cutter with side cutting devices located in the bight of the chain-excavator.

67. A traveling-chain excavator, a rotary cutter with side and end cutting devices located in the bight of the chain-excavator.

68. A dredger for simultaneously removing intermixed coarse and finely-divided material, having an endless-chain elevator for removing coarse material, a rotary excavator with side cutting devices located in the bight of the endless-chain elevator and connected to a flexibly-jointed suction-pipe adapted to remove the finely-divided material disturbed by the excavator and the removal of the coarse material.

69. A traveling endless excavator comprising side links excavating teeth or cutters and elevating-fingers upon bars the ends of which are secured in side sockets in said links.

70. A traveling endless chain comprising side links having a multiplicity of sockets in each side link with excavating and elevating devices attached to a multiplicity of holding devices resting in said sockets.

71. A dredger-chain, the links of which are joined by hinge-pins having depressions or stops approximately one hundred and twenty degrees apart, and a locking-pin or other device adapted to engage with said stops whereby the hinge-pin presents successive wearing-surfaces to the pull of the chain.

72. A suction-pipe and an automatic device adapted to enter the mouth thereof and dislodge an obstruction therefrom.

WILLIAM H. SMYTH.
A. B. BOWERS.

Witnesses:
GEO. W. UEFFINGER,
J. H. MILLER.